United States Patent
Choi et al.

(10) Patent No.: US 10,860,323 B2
(45) Date of Patent: Dec. 8, 2020

(54) METHOD AND APPARATUS FOR PROCESSING INSTRUCTIONS USING PROCESSING-IN-MEMORY

(71) Applicant: Samsung Electronics Co., Ltd., Suwon-si, Gyeonggi-do (KR)

(72) Inventors: Kiyoung Choi, Seoul (KR); Jun-whan Ahn, Seoul (KR); Sung-joo Yoo, Seoul (KR)

(73) Assignee: SAMSUNG ELECTRONICS CO., LTD., Gyeonggi-do (KR)

( * ) Notice: Subject to any disclaimer, the term of this patent is extended or adjusted under 35 U.S.C. 154(b) by 295 days.

(21) Appl. No.: 15/768,254

(22) PCT Filed: Jun. 10, 2016

(86) PCT No.: PCT/KR2016/006154
§ 371 (c)(1),
(2) Date: Apr. 13, 2018

(87) PCT Pub. No.: WO2017/065379
PCT Pub. Date: Apr. 20, 2017

(65) Prior Publication Data
US 2018/0336035 A1      Nov. 22, 2018

(30) Foreign Application Priority Data
Oct. 16, 2015   (KR) .................. 10-2015-0144744

(51) Int. Cl.
*G06F 12/00*     (2006.01)
*G06F 9/35*      (2018.01)
(Continued)

(52) U.S. Cl.
CPC ............ *G06F 9/35* (2013.01); *G06F 9/30087* (2013.01); *G06F 9/52* (2013.01); *G06F 12/0811* (2013.01);
(Continued)

(58) Field of Classification Search
CPC . G06F 9/35; G06F 12/00; G06F 12/08; G06F 13/00; G06F 3/06
(Continued)

(56) References Cited

U.S. PATENT DOCUMENTS 7,805,582 B2   9/2010 Yim et al.
8,726,101 B2   5/2014 Ahn et al.
(Continued)

FOREIGN PATENT DOCUMENTS

KR   10-2008-0068468         11/2013
KR      10-1558807 B1         10/2015
(Continued)

OTHER PUBLICATIONS

Ahn, Junwhan et al., "PIM-Enabled Instructions: A Low-Overhead, Locality-Aware Processing-in-Memory Architecture", Source: 2015 ACM/IEEE 42$^{nd}$ Annual International Symposium on Computer Architecture (ISCA), Jun. 13-17, 2015, pp. 336-348.
(Continued)

*Primary Examiner* — Tuan V Thai
(74) *Attorney, Agent, or Firm* — Harness, Dickey & Pierce, P.L.C.

(57) ABSTRACT

Provided is a method and apparatus for processing instructions using a processing-in-memory (PIM). A PIM management apparatus includes: a PIM directory comprising a reader-writer lock regarding a memory address that an instruction accesses; and a locality tracer configured to figure out locality regarding the memory address that the instruction accesses and determine whether or not an object that executes the instruction is a PIM.

16 Claims, 8 Drawing Sheets

(51) Int. Cl.
  *G06F 9/52* (2006.01)
  *G06F 15/78* (2006.01)
  *G06F 9/30* (2018.01)
  *G06F 12/0811* (2016.01)
  *G06F 12/0817* (2016.01)
  *G06F 12/1027* (2016.01)

(52) U.S. Cl.
  CPC ........ *G06F 15/785* (2013.01); *G06F 15/7821* (2013.01); *G06F 12/082* (2013.01); *G06F 12/1027* (2013.01); *G06F 2212/1008* (2013.01)

(58) Field of Classification Search
  USPC .......................................... 711/100, 141, 154
  See application file for complete search history.

(56) References Cited

U.S. PATENT DOCUMENTS

2008/0177941 A1* 7/2008 Yim ...................... G06F 8/4441
  711/105
2012/0124429 A1* 5/2012 Ahn .................... G06F 11/3471
  714/45
2014/0244948 A1 8/2014 Walker et al.

FOREIGN PATENT DOCUMENTS

KR 10-2012-0052752 2/2017
KR 10-2012-0061341 7/2017

OTHER PUBLICATIONS

Notification Concerning Submission, Obtention or Transmittal of Priority Document (PCT/IB/304), for PCT/KR2016/006154 dated Jun. 10, 2016.
International Search Report (PCT/ISA/210) for PCT/KR2016/006154 dated Jun. 10, 2016.
Written Opinion (PCT/ISA/237) for PCT/KR2016/006154 dated Jun. 10, 2016.
PCT Request KD-52487-PCT for KR 10-2015-0144744 dated Oct. 16, 2015.

* cited by examiner

FIG. 11

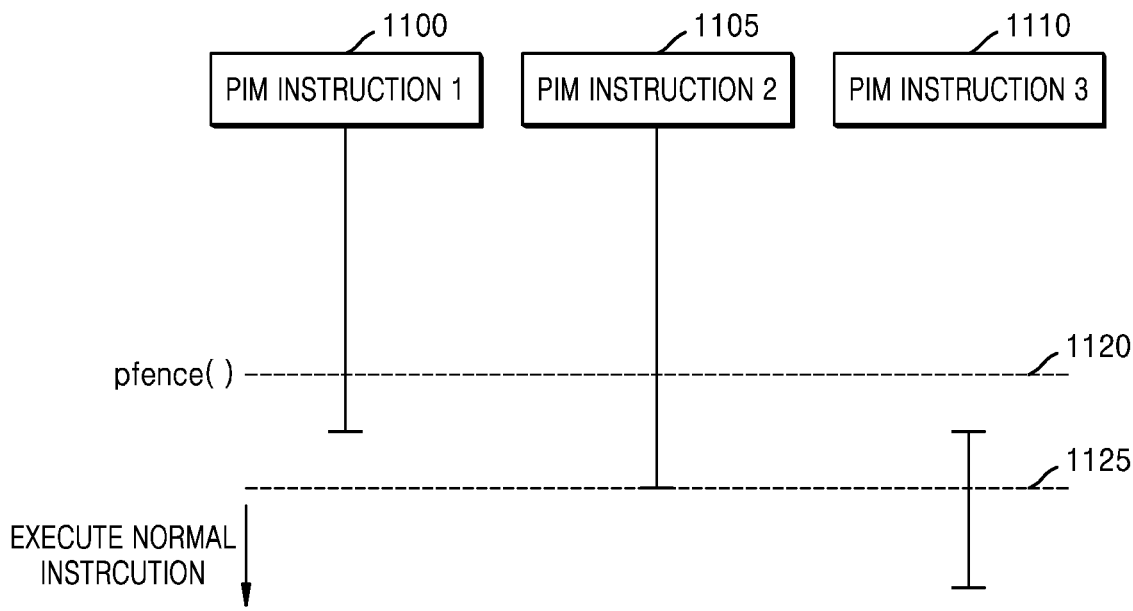

FIG. 12

| Component | Cofiguration |
|---|---|
| Core | 16 out-of-order cores, 4 GHz, 4-issue |
| L1 I/D-Cache | Private, 32 KB, 4/8-way, 64 B blocks, 16 MSHRs |
| L2 Cache | Private, 256 KB, 8-way, 64 B blocks, 16 MSHRs |
| L3 Cache | Shared, 16 KB, 16-way, 64 B blocks, 64 MSHRs |
| On-Chip Network | Crossbar, 2 GHz, 144-bit links |
| Main Memory | 32 GB, 8 HMCs, daisy-chain (80 GB/s full-duplex) |
| HMC | 4 GB, 16 vaults, 256 DRAM banks [20] |
| - DRAM | FR-FCFS, tCL = tRCD = tRP = 13.75 ns [27] |
| - Vertical Links | 64 TSV s per vault with 2 Gb/s signaling rate [23] |

Small inputs

Medium inputs

Large inputs

METHOD AND APPARATUS FOR PROCESSING INSTRUCTIONS USING PROCESSING-IN-MEMORY

CROSS-REFERENCE TO RELATED APPLICATIONS

This is a National Phase under 35 U.S.C. § 120 to, PCT International Application No. PCT/KR2016/006154, filed Jun. 10, 2016, which claims priority under 35 U.S.C. § 120 to Korean Application No. 10-2015-0144744, filed Oct. 16, 2015, the entire contents of which are hereby incorporated by reference.

TECHNICAL FIELD

The present disclosure relates to a method and apparatus for processing instructions using a processing-in-memory (PIM).

BACKGROUND ART

Recently, performance improvement of processors tends to decline due to a bottleneck of memory performance. In particular, due to a memory bandwidth limit called a memory wall, even if a processor performs a computation rapidly, it takes a long time to bring data from a memory, and thus, more and more data-intensive applications have a phenomenon in which the overall performance deteriorates. Accordingly, in order to address the problem, in recently proposed Hybrid Memory Cube standard, etc., processing-in-memory (PIM) instructions for performing a simple computation in a memory are included as a part of standard. However, such a PIM structure has the following problems.

1. Unfamiliar program model: A PIM structure of the related art uses a PIM concept in a way of implementing all new types of accelerators in a memory. Accordingly, in order to use PIM, an existing program should be newly implemented to use all new accelerators, and thus, a programmer's much effort is required.

2. Low compatibility with cache of existing system and virtual memory: An existing PIM structure essentially involves an operation of reading and writing, within a memory, a value stored in the memory. However, a processor may not check such an operation, and thus, two problems in the following occur. First, when data that a cache of the processor has is changed in the memory, a value of the cache is not latest, and thus, there is a problem with coherence of data. For the same reason, when data in the cache is corrected, the memory is unable to know the information. Second, virtual memory address translation is all performed in the processor, and thus, an accelerator in the memory is unable to use a virtual memory address. In summary, an existing PIM structure is not compatible with a cache and virtual memory and thus uses a method that allows a memory region accessible by an accelerator in memory to be simply non-cacheable and physically-addressed. This requires much effort to correct an existing application to make the PIM structure available.

3. Lack of consideration of memory access locality: An existing PIM structure works in a way of using an accelerator in memory all the time to perform a certain computation. However, when an input size is small, all input data may go into a cache of a processor, and in this case, reading data from the cache is more efficient than reading data from a memory, and thus, performance of the accelerator in memory is degraded compared to an existing processor structure.

DISCLOSURE

Technical Problem

Provided is a method and apparatus for processing instructions by using both of a processor and a processing-in-memory (PIM) according to data locality.

Solution to Problem

According to an aspect of the present disclosure, a processing-in-memory (PIM) management apparatus includes: a PIM directory comprising a reader-writer lock regarding a memory address that an instruction accesses; and a locality tracer configured to figure out locality regarding the memory address that the instruction accesses and determine whether or not an object that executes the instruction is a PIM.

According to another aspect of the present disclosure, a method of processing processing-in-memory (PIM) instructions by using a reader-writer lock regarding a memory address and locality information indicating whether data is stored in a cache includes:

Advantageous Effects of Disclosure

The present disclosure provides the following effects.

1. Able to use processing-in-memory (PIM) in similar method to existing programming model: According to the present disclosure, computation capability in a memory may be used through new instructions of a processor. Accordingly, unlike an existing PIM structure in which an existing application should be newly developed for a programming model of a new accelerator in memory, computation capability in a memory may be used as long as new instructions are used in an existing application.

2. Able to manage existing cache coherence and support virtual memory technology: A PIM structure of the related art is not compatible with cache coherence and virtual memory management technology present in a system, and thus, they should be inactivated and used. However, according to the present disclosure, cache coherence management and virtual memory technology present in an existing system may be supported as-is through a method in which a processor performs cache coherence and virtual memory address translation and then sends them to a memory.

3. Selective PIM use in consideration of memory access locality: An existing PIM structure uses a method in which, when an application is developed to use PIM for a certain computation, a computation is performed in a memory all the time at the corresponding part. Such a conventional method has a weakness that, when locality of data changes according to an input size, a cache of a processor may not be used for execution having a small input size. However, in a structure according to the present disclosure, hardware traces locality of a cache block accessed by PIM instructions, and based on this, only the PIM instructions having low memory locality may be executed in a memory, and PIM instructions having high memory locality may be executed in a processor to use a cache. Thus, only the strengths of an existing processor structure and a PIM structure may be used all the time even at input sizes different from each other.

4. In addition, a data-intensive application having performance limited by a memory bandwidth may be accelerated. Considering a recent trend in which the importance of big data applications which have to analyze exponentially increasing data is growing, the present disclosure allowing the data intensive application to accelerate may be importantly used in a server processor structure for big data analysis. In particular, in terms of a current server structure having performance also limited by energy consumption, energy consumption may be reduced in addition to system performance, and thus, the present disclosure may be used as important technology for designing a server.

BRIEF DESCRIPTION OF DRAWINGS

FIG. 11 illustrates an example of a method of maintaining coherence between a PEI and a normal instruction according to the present disclosure.

FIG. 12 illustrates an example of a system configuration for simulation of an instruction processing method using PIM according to the present disclosure.

MODE OF DISCLOSURE

Hereinafter, a method and apparatus for processing instructions using a processing-in-memory (PIM) according to the present disclosure will be described in detail with reference to the accompanying drawings.

Figure 1:
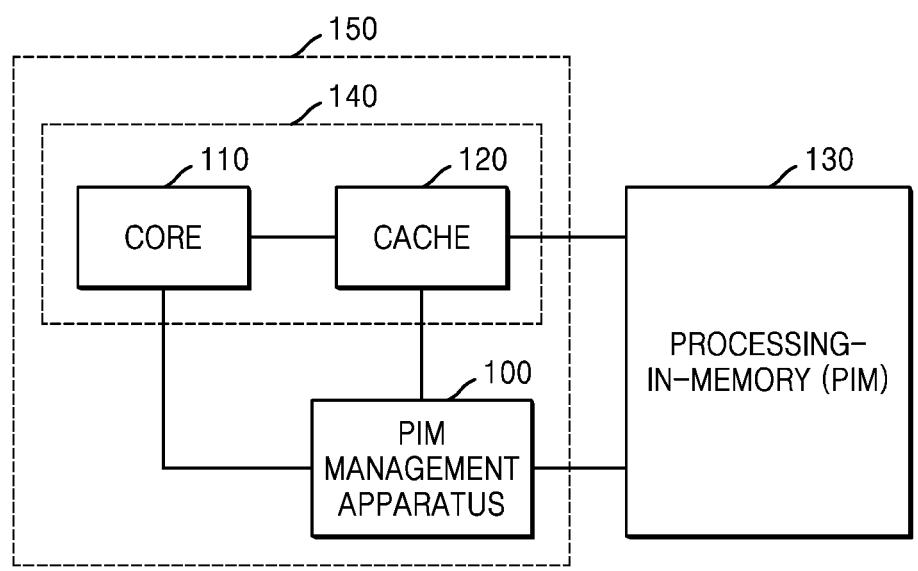
FIG. 1 illustrates a structure for processing-in-memory (PIM) instruction processing according to an embodiment of the present disclosure.

FIG. 1 illustrates a structure for PIM instruction processing according to an embodiment of the present disclosure.

Referring to FIG. 1, a processor 150 includes at least one core 110, at least one cache 120, and a PIM management apparatus 100. The processor 150 may be implemented in various forms such as a central processing unit (CPU) or a graphic processing unit (GPU). The PIM management apparatus 100 may be implemented in the processor 150 or may be implemented separately from a part 140 including the core 110 and the cache 120. In another embodiment, the PIM management apparatus 100 may be implemented as a partial configuration of the core 110 or the cache 120. The present embodiment corresponds to an embodiment for processing PIM instructions, and a hardware structure is not necessarily limited to the present embodiment.

A PIM 130 is a memory capable of autonomously executing instructions and may be implemented in various forms. For example, the PIM 130 may be implemented as 3D-stacked DRAM, Double Data Rate 3/4 (DDR3/4), etc.

In general, there may be instructions executable in the PIM 130 and instructions inexecutable in the PIM 130. Hereinafter, for convenience of description, an instruction executable in the PIM 130 will be referred to as a PIM-enabled instruction (PEI), and the other instruction will be referred to as a normal instruction. The normal instruction is executed in a processor according to a method of the related art.

The PIM management apparatus 100 determines whether to process a PEI in the processor 150 or in the PIM 130, based on locality of data accessed by the PEI. In this regard, locality indicates how often data is used, and when the same data is repeatedly used within a short time, or spatially nearby pieces of data are accessed within a short time, data may be referred to as having high locality. In general, a cache is configured to store data having high locality, and thus, data having high locality is highly likely to be stored in a cache, and data having low locality is highly likely to be stored in a memory instead of the cache. Accordingly, the PIM management apparatus 100 allows the core 110 to execute an instruction by using the cache 120 when the locality of data accessed by the PEI is high, and allows the PIM 130 to execute an instruction by using data stored in the memory when the locality is low.

As an example, the PIM management apparatus 100 may determine data whose number of uses is large or usage frequency is high as having high locality, and data whose number of uses is small or usage frequency is low as having low locality. In this case, the PIM management apparatus 100 may determine the PEI that intends to use data whose locality is equal to or greater than a critical value so as to be processed in the processor 150, and may determine the PEI that intends to use data whose locality is less than the critical value so as to be processed in the PIM 130.

Locality of data may be otherwise referred to as locality of a memory address where the corresponding data is stored. Accordingly, the PIM management apparatus 100 may determine a memory address whose number of accesses of instructions is large or access frequency of instructions during a certain time period is high as having high locality, and may determine a memory address whose number of accesses is small or access frequency is low as having low locality.

As another example, when the latest version of data that will be used during execution of the PEI is stored in a cache, the PIM management apparatus 100 may determine locality of corresponding data as high and determine the PEI so as to be processed in the processor 150, and when the latest version of data that will be used is stored in a memory, the PIM management apparatus 100 may determine locality of corresponding data as low and determine the PEI so as to be processed in the PIM 130.

In addition, locality may be determined through a combination of the above-described locality determination conditions, or may be determined by additionally using another condition. Since the above description of locality is an embodiment, the present disclosure is not limited thereto.

The PIM management apparatus 100 traces data locality of the PEI by using information of a cache block accessed by the PEI. The PIM management apparatus 100 may trace locality by using information that is the same as or similar to a tag array including information regarding a memory address of data stored in a cache. For example, the PIM management apparatus 100 may figure out locality of data accessed by the PEI through a tag array stored in a cache, or may manage locality by autonomously storing, in the PIM management apparatus 100, information that is the same as or similar to a tag array of a cache. Various embodiments of the PIM management apparatus 100 are illustrated in FIGS. 2 to 5.

In the present embodiment, an object that executes the PEI is determined not by software such as an application but by the PIM management apparatus 100 according to locality of data accessed by the PEI, and thus, a programmer, etc. may develop an application according to an existing programming model without extra consideration of who executes the PEI.

Since the PEI is executed in a processor or a PIM based on locality, there may be a problem with coherence between data stored in a cache and a memory. For example, when the PEI is executed in the PIM 130, the latest version of data may be in the cache 120, and the previous data may be in the PIM 130. On the other hand, when the PEI or the normal instruction is executed in the processor 150, the latest version of data may be in the PIM 130, and the previous data may be in the cache 120. In order to address this issue, when it is the PIM 130 that executes the PEI, the PIM management apparatus 100 transmits a request for reflecting data stored in the cache 120 in a memory (writeback request) (in a case of the PEI for a read operation) or a request for invalidating data stored in the cache 120 (invalidation request) (in a case of the PEI for a write operation) to the cache 120 before transmitting the PEI to the PIM 130. In other words, before the PEI is executed in the PIM 130, the latest version of data stored in the cache 120 may be reflected in the PIM 130, or data stored in the cache 120 may be invalidated, and accordingly, cache coherence may be satisfied.

Figure 6:
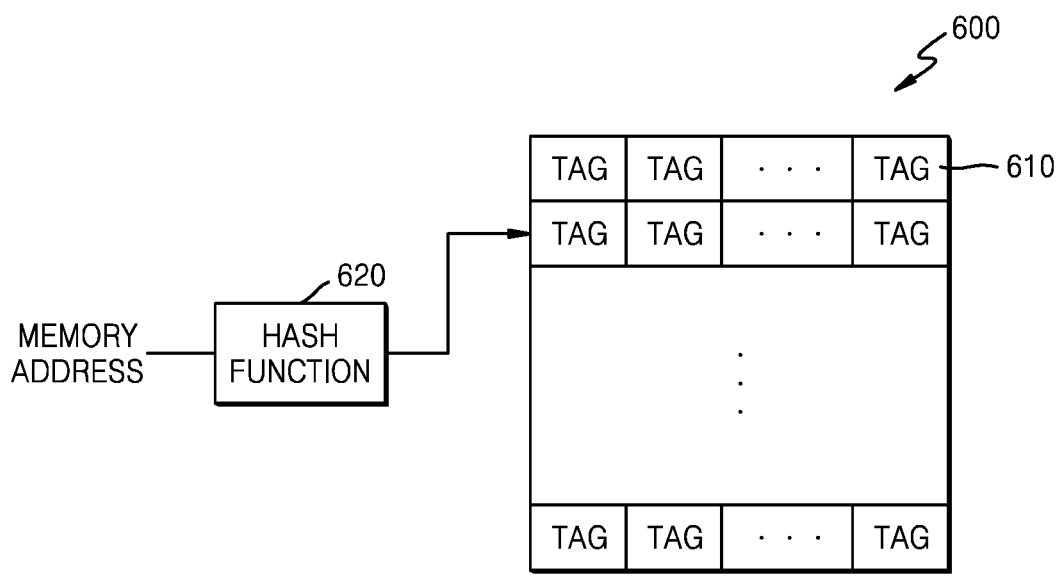
FIG. 6 illustrates a structure of a locality tracer of a PIM management apparatus according to an embodiment of the present disclosure.
Figure 7:
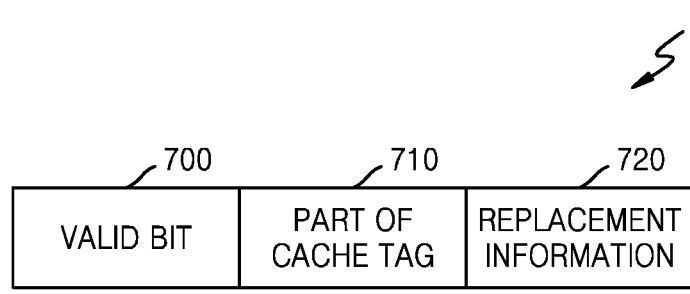
FIG. 7 illustrates an example of information stored in each tag of a locality tracer according to the present disclosure.

When a plurality of PEIs are simultaneously executed, the same memory address may be simultaneously accessed. For example, when a first PEI performs an operation of reading or writing data of a first memory address, a second PEI should be prevented from accessing the first memory address and changing data. Preventing an instruction (PEI or normal instruction) from being interfered by another instruction (PEI or normal instruction) is called guaranteeing atomicity of an instruction. To guarantee atomicity, the PIM management apparatus 100 stores and manages a lock regarding a memory address accessed by the PEI so that the PEI may be executed after the lock is obtained. Various embodiments of a method in which the PIM management apparatus 100 manages a lock are illustrated in FIGS. 2, 6 and 7.

For example, when the first PEI intends to perform a read or write operation regarding a first memory address, the first PEI obtains a lock regarding the first memory address from a PIM management apparatus. After the lock is obtained, the first PEI is executed. When the second PEI intends to perform a read or write operation regarding the first memory address, the first PEI has a lock, and thus, the second PEI is in a standby status until the corresponding lock is unlocked. Not only atomicity between PEIs but also atomicity between a PEI and a normal instruction should be guaranteed, and this will be described with reference to FIG. 11.

Like the normal instruction, the PEI may use a virtual memory address. Accordingly, an existing operating system or application does not need to be changed for virtual memory support of the PEI. For example, a virtual memory address of the PEI is changed to a physical address by using a translation lookaside buffer (TLB) in an existing processor, and then, the PEI is executed in a processor or a PIM according to an object of execution determined by the PIM management apparatus 100.

Figure 2:
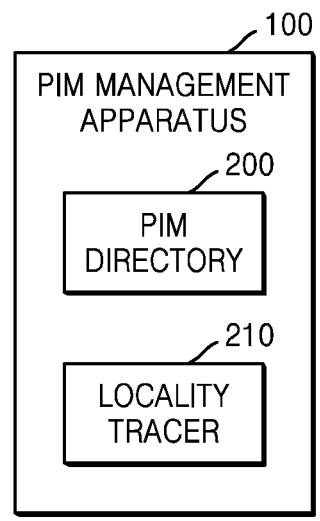
FIG. 2 illustrates a structure of a PIM management apparatus according to an embodiment of the present disclosure.

FIG. 2 illustrates a structure of the PIM management apparatus 100 according to an embodiment of the present disclosure.

Referring to FIG. 2, the PIM management apparatus 100 includes a PIM directory 200 and a locality tracer 210.

The PIM directory 200 includes a reader-writer lock regarding a memory address accessed by each PEI to guarantee atomicity between PEIs. The PIM directory 200 may include a reader-writer lock for each every memory address accessible by the PEI. When the PEI performs a read or write operation for each cache block, the total number of entries of the reader-writer lock included in the PIM directory 200 may be equal to or less than a value obtained by dividing a main memory size (that is, a memory size of a PIM) by a size of a cache block.

As another example, the PIM directory 200 may store a certain number of reader-writer locks to reduce storage space of a reader-writer lock. In this case, although different memory address may share one reader-writer lock, there is no problem with atomicity between PEIs. This will be explained again with reference to FIG. 3.

The locality tracer 210 manages locality information for determining whether the PEI will be executed in a processor or in a PIM. When locality is high, it is advantageous to use a cache, and thus, the PEI is executed in the processor. When locality is low, the cache does not help much, and thus, executing the PEI in a memory shows high performance.

The locality tracer 210 is composed of a tag array including information regarding a memory address of data accessed by the PEI. A tag included in the locality tracer 210 may be in a form that is the same as or similar to that of a tag of the cache 120. An example of the tag is illustrated in FIGS. 6 and 7.

Figure 3:
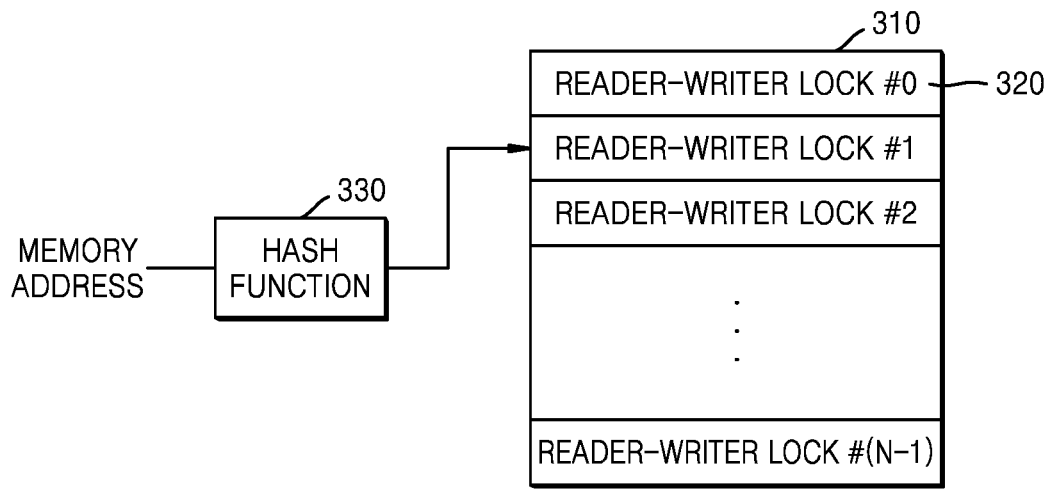
FIG. 3 illustrates a PIM directory of a PIM management apparatus according to an embodiment of the present disclosure.
Figure 4:
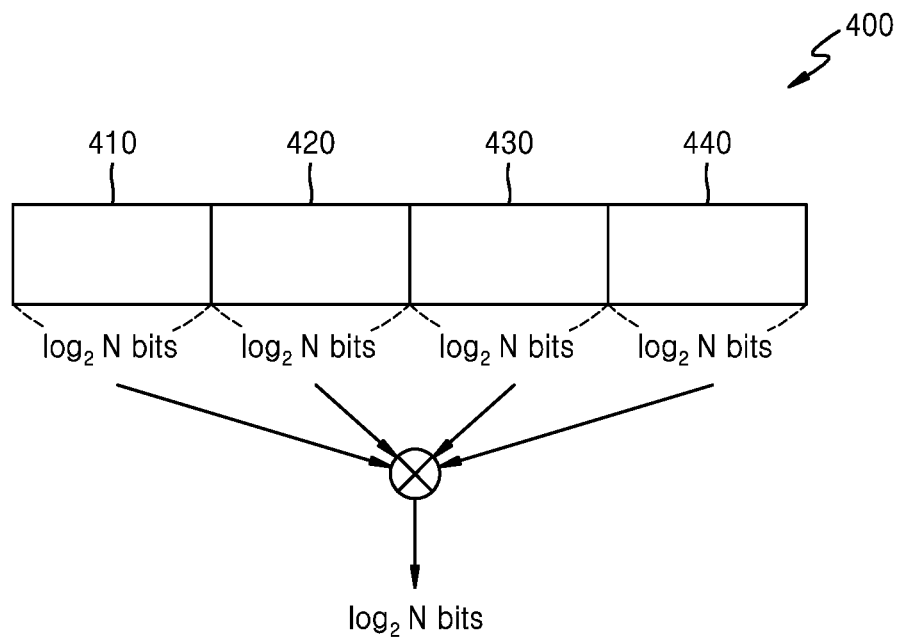
FIG. 4 illustrates an example of a hash function for finding a reader-writer lock within a PIM directory.

FIG. 3 illustrates a PIM directory of a PIM management apparatus according to an embodiment of the present disclosure. FIG. 4 illustrates an example of a hash function for finding a reader-writer lock within a PIM directory.

Referring to FIG. 3, a PIM directory is composed of an array 310 including a plurality of reader-writer lock entries 320. The PIM directory may include a certain number (N) of reader-writer locks to decrease a size of storage space of the reader-writer lock entries 320. In this case, a memory address accessed by the PEI and a reader-writer lock of the PIM directory are not in one-to-one correspondence. In other words, a plurality of memory addresses may correspond to one reader-writer lock.

For example, when a value of a hash function 330 regarding a first memory address and a value of the hash function 330 regarding a second memory address are identical, the first memory address and the second memory address share one reader-writer lock. Accordingly, although a first PEI that accesses the first memory address and a second PEI that accesses the second memory address access different memory addresses from each other, when the first PEI obtains a reader-writer lock first, the second PEI waits until the lock obtained by the first PEI is unlocked.

There may be various ways of finding a reader-writer lock regarding each memory address, and for example, as illustrated in FIG. 4, a reader-writer lock regarding a memory address within the PIM directory may be found by using XOR as a hash function.

Referring to FIG. 4, when the number of reader-writer locks within the PIM directory is N, a memory address 400 accessed by the PEI is split into log$_2$N bits first, and XOR is performed on every piece 410, 420, 430 and 440 to obtain log$_2$N-bit address Y. In addition, a Y$^{th}$ reader-writer lock within the PIM directory is used as a lock for the corresponding PEI.

Figure 5:
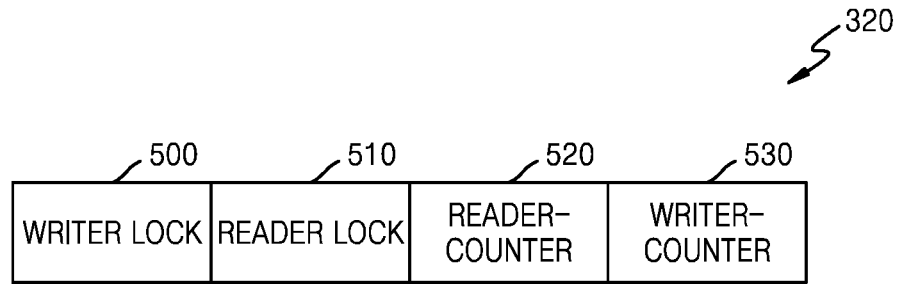
FIG. 5 illustrates an example of information included in a reader-writer lock within a PIM directory according to the present disclosure.

FIG. 5 illustrates an example of information included in a reader-writer lock within a PIM directory according to the present disclosure.

Referring to FIG. 5, each reader-writer lock entry 320 includes a writer lock field 500, a reader lock field 510, a reader-counter field 520, and a writer-counter field 530.

The writer lock field 500 indicates whether a lock for a write operation is set on the PEI. For example, the writer lock field 500 is composed of 1 bit, and '1' indicates the lock set and '0' indicates the lock unlocked.

The reader lock field 510 indicates whether a lock for a read operation is set on the PEI. For example, the reader lock field 510 is composed of 1 bit, and '1' indicates the lock set and '0' indicates the lock unlocked.

The reader-counter field 520 indicates the number of reader locks set. When a plurality of PEIs perform only a read operation with respect to the same memory address, data has no change, and thus, the plurality of PEIs may be executed simultaneously. For example, when a first PEI obtains a lock for a read operation with respect to a first memory address, the reader-counter field 520 of a reader-writer lock regarding the first memory address comes to 1. When a second PEI obtains again the lock for a read operation with respect to the first memory address before completion of the first PEI, the reader-counter field 520 comes to 2. The first and second PEIs having obtained the lock may be executed simultaneously. A value of the reader-counter field 520 increases to a maximum allowable number of the reader lock. When the value exceeds the maximum allowable number of the reader lock, the PEI should wait until the lock is unlocked.

The writer-counter field 530 indicates the number of writer locks set. Unlike the reader lock, the writer lock does not allow a case in which a plurality of PEIs perform a write operation or a case in which a plurality of PEIs perform read and write operations.

FIG. 6 illustrates a structure of a locality tracer of a PIM management apparatus according to an embodiment of the present disclosure.

Referring to FIG. 6, the locality tracer 210 is composed of a tag array 600. Each tag 610 indicates whether data regarding a memory address accessed by the PEI is in a cache. For example, the tag array 600 of the locality tracer 210 may be in a form that is the same as or similar to that of a tag array of the cache 120. An example of information included in a tag array of the locality tracer 210 is illustrated in FIG. 7.

The locality tracer 210 stores each tag 610 distinctively, using a hash value regarding a memory address. Accordingly, when figuring out locality regarding a memory address accessed by the PEI, the locality tracer 210 figures out whether the locality is high, based on whether there is a tag corresponding to the hash value regarding the memory address. There may be various hash functions 620 for obtaining a hash value regarding a memory address, and for example, as illustrated in FIG. 4, the memory address may be divided into a plurality of groups, and a value resulting from XOR performed on each group may be obtained as a hash value.

The tag array 600 of the locality tracer 210 is renewed every time the PEI accesses a cache, and further, is renewed as if there were an access to a corresponding cache block even when the PEI is executed in the PIM 130. In this regard, renewal refers to an operation of replacing or renewing each tag 610 inside the locality tracer 210 according to a cache block replacement algorithm of the cache like replacing or renewing a cache block in a tag array of the cache 120. The reason is that, when the PEI is executed in the PIM 130, data accessed by the PEI is not stored in the cache, and thus, even if the corresponding data is accessed by the PEI several times, locality of the data may not be figured out. Once the locality tracer 210 is renewed every time the PEI is executed in a memory, when several PEIs access the same memory address, a record thereof remains in the locality tracer 210, and thus, it may be found out that corresponding data has high locality.

FIG. 7 illustrates an example of information stored in each tag of a locality tracer according to the present disclosure.

Referring to FIG. 7, each tag 610 stored in the locality tracer 210 includes a valid bit field 700, a cache tag field 710, and a replacement information field 720.

The valid bit field 700 indicates whether data stored in a cache is valid.

The cache tag field 710 includes information stored in a tag of the cache or information of a part thereof. For example, the cache tag field 710 may include a value obtained by hashing a memory address stored in a tag of the cache 120 as illustrated in FIG. 4.

The replacement information field 720 includes information for replacement of data stored in the cache. For example, when new data intends to be stored in the cache, data oldest referred to is deleted, and in this regard, the data oldest referred to is identified by using the replacement information field 720.

Figure 8:
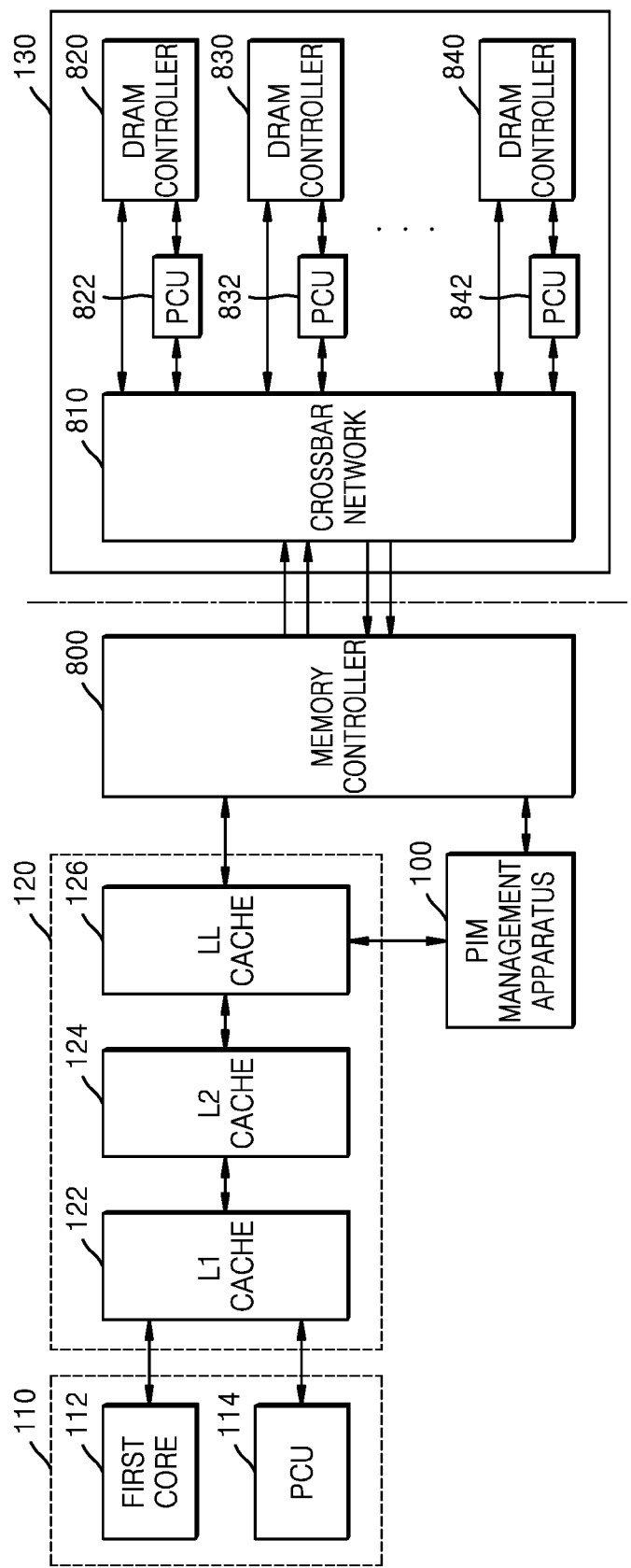
FIG. 8 illustrates a structure for PIM instruction processing according to another embodiment of the present disclosure.

FIG. 8 illustrates a structure for PIM instruction processing according to another embodiment of the present disclosure.

Referring to FIG. 8, the core 110 is composed of a first core 112 and a PEI computation unit (PCU) 114, and the cache 120 is composed of a plurality of caches such as an L1 cache 122, an L2 cache 124, and a last level (LL) cache 126. In addition, a memory controller 800 for transmission and reception of data with the PIM 130 is included. Also, the PIM 130 is composed of a crossbar network 810, a plurality of DRAM controllers 820, 830, and 840, and a plurality of PCUs 822, 832, and 842. The PIM 130 may be implemented in other various forms.

A data size of a memory address accessed by the PEI may be greater than a size of a cache block. In this case, the PIM 130 further requires a configuration for managing a mapping relationship between data to execute the PEI. Accordingly, when the PIM 130 supports data equal to or greater than the size of a cache block, the data size of a memory address accessed by the PEI may have no limit. However, for convenience of description, it will be hereinafter assumed that a size of data accessed by the PEI is one cache block. In other words, the PEI is assumed to perform a write operation, a read operation, or simultaneously write and read operations regarding one cache block.

The LL cache 126 is assumed to include both of data and tag information stored in the L1 cache 122 and the L2 cache 124. Accordingly, the PIM management apparatus 100 is connected to the LL cache 126 in the present embodiment. Unless the LL cache 126 includes information regarding the L1 cache 122 or the L2 cache 124, the PIM management apparatus 100 may be connected to each of the L1 cache 122, the L2 cache 124, the LL cache 126, etc. and perform an operation according to the present embodiment.

In a case in which, when data is changed as the PEI is executed in the PIM 130, the previous version of data remains as-is in a cache, the core 110 fails to read the latest version of data via the cache 120. Accordingly, before the PEI including a write operation is sent to the PIM 130, the PIM management apparatus 100 sends an invalidation request regarding a target cache block to the LL cache 126. Once receiving the request, all the caches 122, 124, and 126 of a processor invalidates the corresponding cache block. There may be various ways of implementing this, and if the cache 120 is an inclusive cache hierarchy, a back-invalidation request already existing may be used as-is. Accordingly, a phenomenon in which data changed in the PIM is shaded by data remaining in the cache may be prevented, and thus, cache coherence may be maintained.

When data is not changed as the PEI is executed in the PIM 130, and data remains in a dirty state in the cache 120, the PCUs 822, 832, and 842 of the PIM 130 may not read the latest version of data stored in the cache 120, and thus, the corresponding PEI is executed based on the previous data. In order to address the problem, before the PEI not changing data of the PIM is sent to the PIM, the PIM management apparatus 100 sends a request for reflecting data of the cache 120 in a memory to the LL cache 126. Once receiving the request, when the corresponding data remains in the dirty state, the LL cache 126 changes it into a clean state and uses the corresponding latest version of data in the memory. When the PEI is executed later, the latest version of data has been reflected in the PIM 130, and thus, cache coherence is maintained.

In order to support a virtual memory, a given virtual memory address is translated to a physical address before each PEI begins. A TLB may be used for address translation. When a memory address is translated to a physical address, the physical address is used all the time regardless of a location where the PEI is executed during a subsequent process, and thus, the virtual memory is completely supported with respect to the PEI. In addition, every PEI uses a physical memory address, and thus, the virtual memory for the PIM 130 may be supported without putting a memory management unit (MMU) into the memory.

In the present embodiment, unlike FIG. 1, the processor 150 and the PIM 130 include the PCU 114 and the PCUs 822, 832, and 842, respectively. In the present embodiment, each DRAM has the PCUs 822, 832, and 842, and thus, it is desirable that the PEI reads and writes data for each cache block. A structure of the PCUs 114, 822, 832, and 842 may vary according to a type of computation supported. The processor-side PCU 114 may be implemented in any form as long as it is an apparatus that may read data from the cache 120 and perform a computation, and if necessary, may write data to the cache. The processor-side PCU 114 is illustrated for understanding of the present embodiment, and may be modified in various forms according to embodiments, such as being implemented as a part of a core or being implemented in a software manner.

Figure 9:
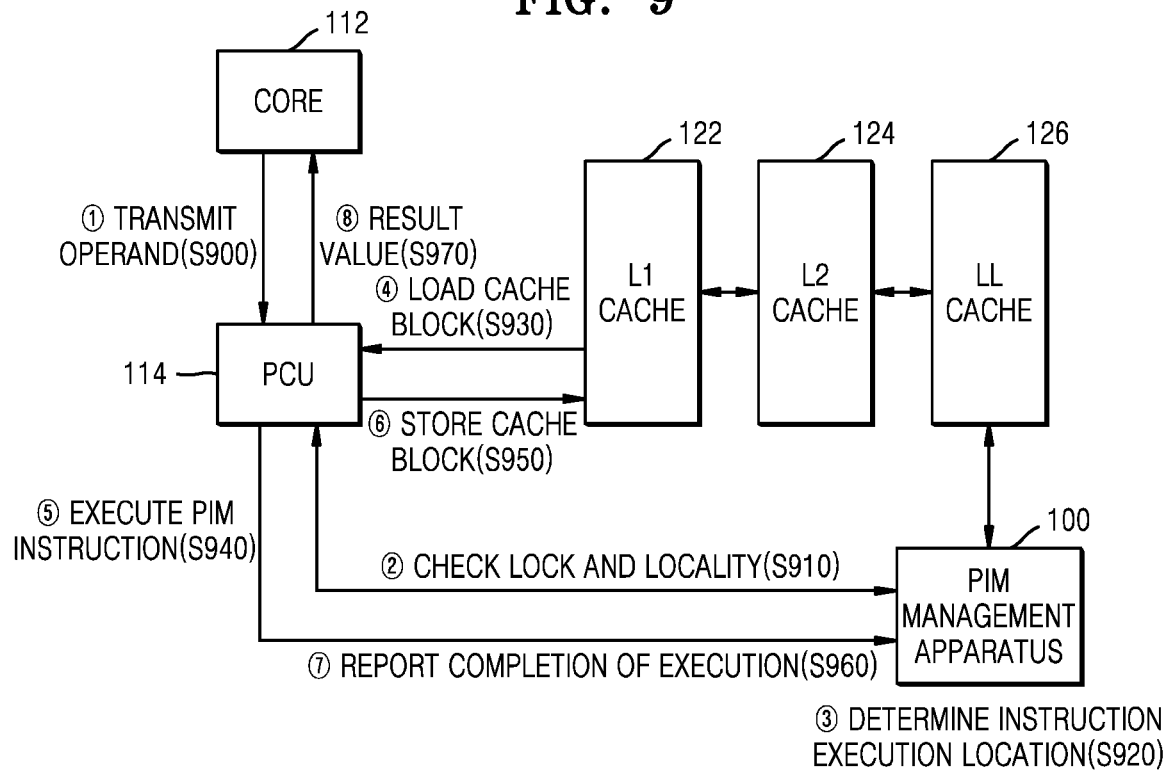
FIGS. 9 and 10 illustrate, based on the structure of FIG. 8, an instruction processing method using a PIM according to the present disclosure.
Figure 10:
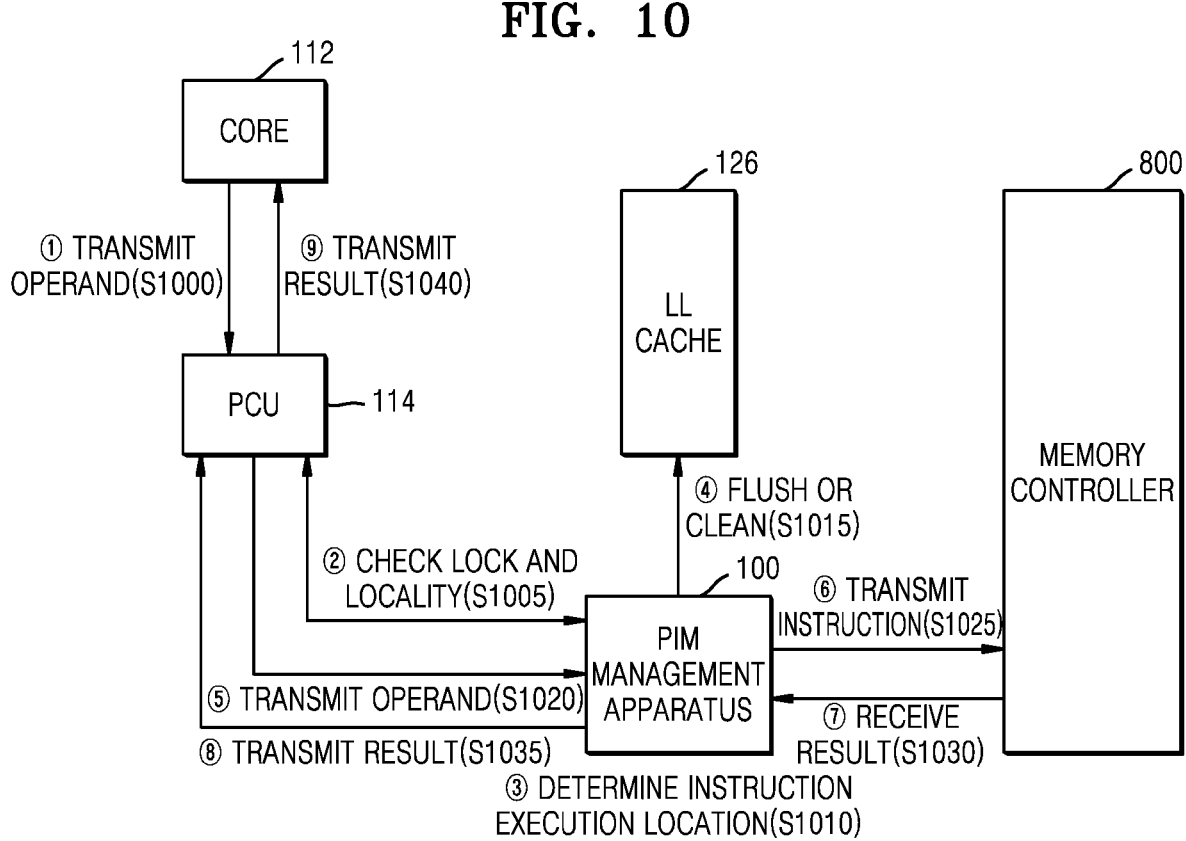

FIGS. 9 and 10 illustrate, based on the structure of FIG. 8, an instruction processing method using a PIM according to the present disclosure.

For better understanding of the present embodiment, it is assumed that the PEI is an instruction that performs a computation of 'x+y', y is an operand that receives an input via a core, and x is an operand that is stored in a cache or a memory.

First, FIG. 9 illustrates a case in which the PEI is executed in a processor. In operation S900, the core 112 transmits an operand y of the PEI to the PCU 114. In some embodiments, the PCU 114 may translate a virtual memory address that will be accessed by the PEI to a physical memory address by using a TLB.

In operation S910, the PIM management apparatus 100 provides a reader-writer lock regarding an operand x to the PEI, and checks locality of the operand x. In operation S920, the PIM management apparatus 100 determines, based on the locality, whether an object that executes the PEI is the processor 150 or the PIM 130. It is assumed in the present embodiment that the object that executes the PEI is determined as the processor 150 based on high locality.

The PCU 114 reads data of the operand x from the L1 cache 122 in operation S930 and executes the PEI in operation S940. In addition, when storage of data in the cache 120 is required, data (e.g., a result of x+y) is stored in the cache 120 in operation S950. When execution of the PEI is completed, the PCU 114 notifies the PIM management apparatus 100 of completion of execution of the PEI in operation S960. Then, the PIM management apparatus 100 unlocks the reader-writer lock provided to the PEI. In addition, the PCU 114 provides a PEI result value to the core 112 in operation S970.

Next, FIG. 10 illustrates a case in which the PEI is executed in a PIM. In operation S1000, the core 112 transmits an operand y of the PEI to the PCU 114. In some embodiments, the PCU 114 may translate a virtual memory address that will be accessed by the PEI to a physical memory address by using a TLB.

In operation S1005, the PCU 114 obtains a reader-writer lock regarding an operand x from the PIM management apparatus 100 and checks locality of the operand x. In operation S1010, the PIM management apparatus 100 determines, based on the locality, whether an object that executes the PEI is a processor or a PIM. It is assumed in the present embodiment that the object that executes the PEI is determined as the PIM based on low locality.

When the PEI performs only a read operation, the PIM management apparatus 100 sends a back-writeback request to the LL cache 126 in operation S1015 so that, when data that will be accessed by the PEI is in a dirty state in a cache, it may be writeback to a main memory. When the PEI reads and writes data, the PIM management apparatus 100 sends a back-invalidation request to the LL cache 126 in operation S1015 so that, when data that will be accessed by the PEI is in the cache 120, all may be discarded.

In operation S1020, the PCU 114 transmits the operand y to the PIM management apparatus 100, and in operation 1025, the PIM management apparatus 100 transmits the operand y and the PEI to the PIM 130. When the PIM management apparatus 100 receives a result value from the PIM 130 in operation S1030, the result value is transmitted to the core 112 via the PCU 114 in operations S1035 and S1040, and the reader-writer lock set on the PEI is unlocked.

FIG. 11 illustrates an example of a method of maintaining coherence between a PEI and a normal instruction according to the present disclosure.

Referring to FIG. 11, a new function is introduced to maintain coherence between the PEI and the normal instruction. In the present embodiment, the function is denoted as pfence( ).

When a processor meets pfence( ) while executing an instruction in an application, the processor figures out the PEI being executed before the pfence( ) (1120). For example, when the PEI having obtained a lock via a PIM directory of a PIM management apparatus is first and second PEIs (1100, 1105), the processor waits execution of the normal instruction until execution of the first and second PEIs (1100, 1105) is completed.

When execution of the first and second PEIs (1100, 1105) is completed, in other words, when a lock regarding the first and second PEIs (1100, 1105) is all unlocked (1125), the processor executes the normal instruction. Since a third PEI (1110) is executed after the pfence( ), the normal instruction is executed regardless of whether the third PEI has been executed.

FIG. 12 illustrates an example of a system configuration for simulation of an instruction processing method using PIM according to the present disclosure. FIGS. 13 and 14 illustrate a result of simulation via the system of FIG. 12.

The present simulation uses three different sizes of data input with respect to 10 applications to show performance according to data locality, and a result thereof is shown in FIG. 13.

Referring to FIG. 13, a result obtained by normalizing result values of a case in which all PEIs are executed in a processor, a case in which all PEIs are executed in a PIM, and a case in which an object that executes a PEI changes based on locality as instructions per cycle (IPC) is illustrated.

Figure 13A:
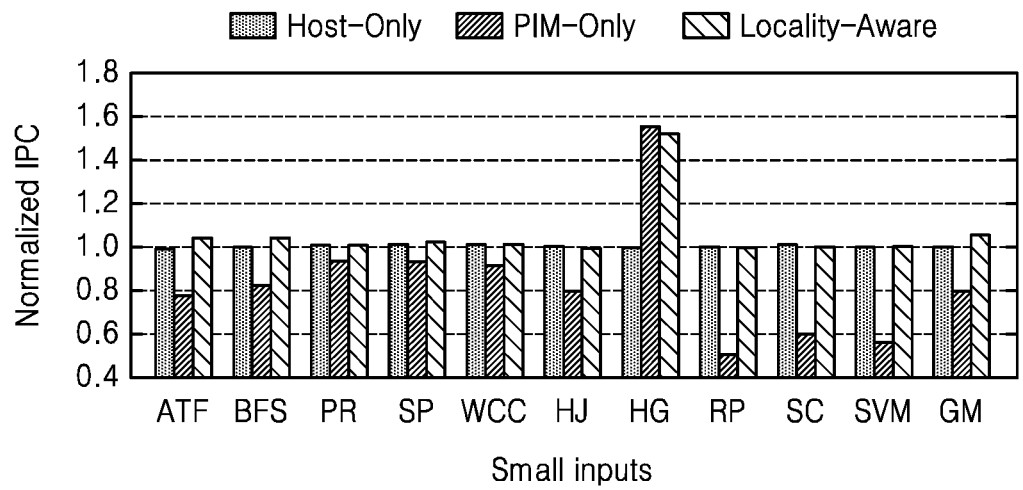
FIGS. 13 and 14 illustrate a result of simulation via the system of FIG. 12.
Figure 13B:
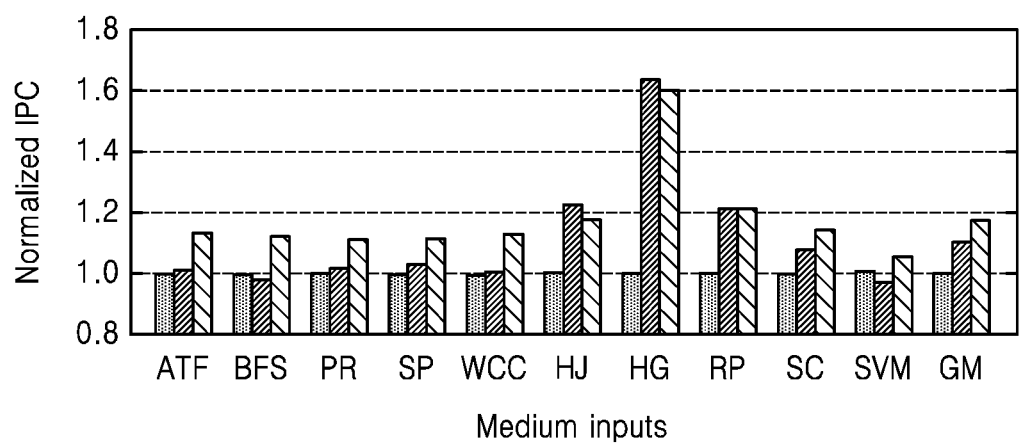
Figure 13C:
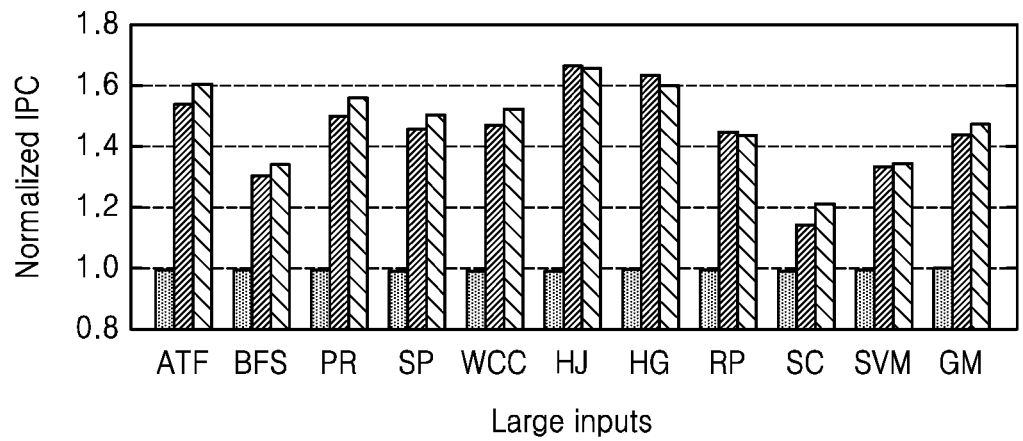
Figure 14:
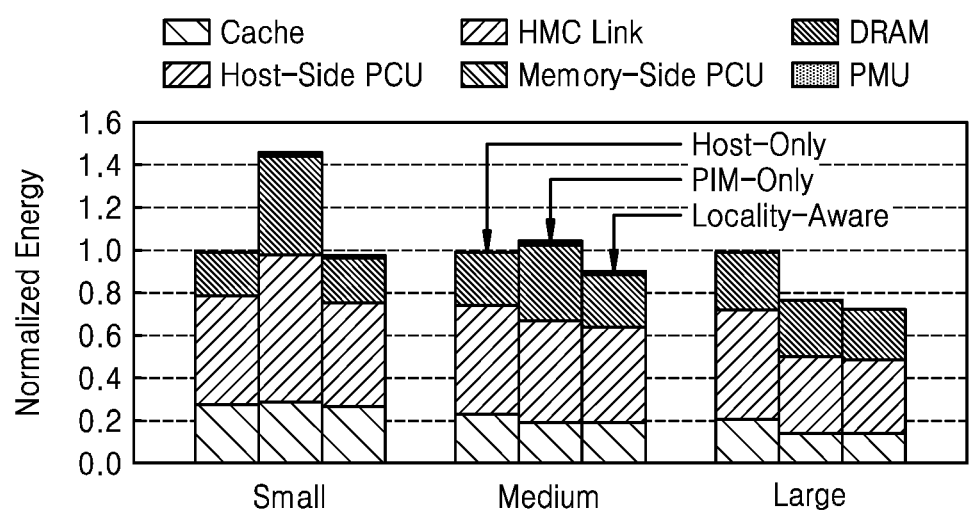

When input data is large (FIG. 13(c)), the method according to the present disclosure shows the same performance obtained when all PEIs are executed in a memory (performance improved by an average of 47% compared to the case in which when all are executed in the processor), and when input data is small (FIG. 13(a)), the method shows the same performance obtained when all PEIs are executed in the processor. When input data is small, the present disclosure shows improvement of performance by an average of 32% compared to execution in the PIM. In addition, when an input size is medium (FIG. 13(b)), both of execution in the processor and execution in the PIM are used, and thus, performance is improved compared to a case in which only one of the two is used.

Referring to FIG. 14, the present disclosure shows excellent performance even in evaluation of power consumption. According to the present disclosure, regardless of a size of input data, power consumption may be small compared to the related art. In addition, as in performance evaluation of FIG. 13, with respect to a medium size of input data, power consumption may be small compared to both of execution in the processor and execution in the PIM.

The present disclosure may be embodied as computer-readable codes on a computer-readable recording medium. The computer-readable recording medium includes any storage device that may store data which may be read by a computer system. Examples of the computer-readable recording medium include read-only memories (ROMs), random-access memories (RAMs), CD-ROMs, magnetic tapes, floppy disks, and optical data storage devices. The computer-readable recording medium may be distributed over network-coupled computer systems so that the computer-readable codes are stored and executed in a distributed fashion.

While the present disclosure has been particularly shown and described with reference to embodiments thereof, it will be understood that various changes in form and details may be made therein without departing from the spirit and scope of the following claims. Therefore, the embodiments described herein should be considered in a descriptive sense only and not for purposes of limitation. The present disclosure is defined not by the detailed description but by the appended claims, and all differences within the scope will be construed as being included in the present disclosure.

The invention claimed is:

1. A processing-in-memory (PIM) management apparatus comprising:
 a PIM directory comprising a reader-writer lock regarding a memory address that an instruction accesses; and
 a locality tracer configured to figure out locality regarding the memory address that the instruction accesses and determine whether or not an object that executes the instruction is a PIM memory,
 wherein, when the object that executes the instruction is the PIM memory, the locality tracer transmits a request for reflecting data stored in a cache in the PIM memory or a request for discarding data stored in the cache to the cache according to whether an operation of the instruction is a write operation or a read operation.

2. The PIM management apparatus of claim 1, wherein a total number of reader-writer locks in the PIM directory is equal to or less than a value obtained by dividing a size of an entire storage space of the PIM memory by a size of a cache unit block.

3. The PIM management apparatus of claim 1, wherein the PIM directory comprises a reader-writer lock that is stored distinctively using a hash value regarding a memory address.

4. The PIM management apparatus of claim 1, wherein each reader-writer lock of the PIM directory comprises:
 information indicating whether a writer lock is set;
 information indicating whether a reader lock is set; and
 information regarding a number of reader locks.

5. The PIM management apparatus of claim 1, wherein the locality tracer determines, based on a tag comprising information regarding a memory address of data stored in a cache, the object that executes the instruction as the PIM memory when the memory address that the instruction accesses is not in the tag.

6. The PIM management apparatus of claim 5, wherein the locality tracer renews the tag when the cache is accessed or when the object that executes the instruction is determined as the PIM memory.

7. The PIM management apparatus of claim 5, wherein the tag comprises a hash value of a cache tag.

8. A method of processing processing-in-memory (PIM) instructions by using a reader-writer lock regarding a memory address and locality information indicating whether data is stored in a cache, the method comprising:
 obtaining a reader-writer lock regarding a memory address that an instruction accesses;
 figuring out locality of the memory address that the instruction accesses; and
 determining, based on the locality, whether an object that executes the instruction is a PIM memory; and
 when the object that executes the instruction is the PIM memory, transmitting a request for reflecting data stored in a cache in the PIM memory or a request for discarding data stored in the cache to the cache according to whether an operation of the instruction is a write operation or a read operation.

9. The method of claim 8, wherein the obtaining of the reader-writer lock comprises:
 figuring out whether the reader-writer lock has been set on the memory address that the instruction accesses, in a PIM directory comprising a reader-writer lock array;
 when the lock has been set, waiting until the lock is unlocked; and when the lock has not been set, setting a lock for the instruction.

10. The method of claim 9, wherein the setting of the lock for the instruction comprises
when the instruction is a read operation, and a number of reader-writer locks set is equal to or less than a certain number, obtaining the lock for the instruction.

11. The method of claim 9, wherein the figuring out of whether the reader-writer lock has been set comprises:
obtaining a hash value regarding the memory address that the instruction accesses; and
checking whether the reader-writer lock has been set by searching the PIM directory using the hash value.

12. The method of claim 8, wherein the determining comprises:
when data regarding the memory address that the instruction accesses is in the cache, determining, based on the locality information, the object that executes the instruction as a processor; and
when data regarding the memory address is not in the cache, determining the object that executes the instruction as the PIM memory.

13. The method of claim 12, wherein the transmitting further comprises,
when the object that executes the instruction is determined as the PIM memory, if the instruction is related to a read operation, transmitting a request for reflecting data stored in the cache in the PIM memory to the cache, and if the instruction is related to a write operation, transmitting a request for discarding data stored in the cache to the cache.

14. The method of claim 12, further comprising, when the object that executes the instruction is determined as the PIM memory, renewing the locality information.

15. The method of claim 8, wherein the memory address that the instruction accesses is an address translated to a physical address by using a translation lookaside buffer (TLB).

16. A non-transitory computer-readable recording medium having recorded thereon a program for performing the method of claim 8.

* * * * *